United States Patent
Cheng et al.

(10) Patent No.: US 7,529,464 B2
(45) Date of Patent: May 5, 2009

(54) METHOD FOR IMPLEMENTING AN ADAPTIVE MIXING ENERGY RATIO IN A MUSIC-SELECTED VIDEO EDITING ENVIRONMENT

(75) Inventors: Yiou-Wen Cheng, Taipei Hsien (TW); Chen-Hsiu Huang, Chi-Lung (TW); Ming-Jun Chen, Tai-Nan (TW)

(73) Assignee: CyberLink Corp., Hsin-Tien, Taipei Hsien (TW)

( * ) Notice: Subject to any disclaimer, the term of this patent is extended or adjusted under 35 U.S.C. 154(b) by 972 days.

(21) Appl. No.: 10/711,914

(22) Filed: Oct. 13, 2004

(65) Prior Publication Data

US 2006/0078287 A1    Apr. 13, 2006

(51) Int. Cl.
*H04N 5/93* (2006.01)
*G11B 27/00* (2006.01)
*H04N 5/76* (2006.01)
*H04N 7/00* (2006.01)

(52) U.S. Cl. .......................... 386/52; 386/46
(58) Field of Classification Search .......... 386/1, 386/45–46, 52, 55, 125
See application file for complete search history.

(56) References Cited

U.S. PATENT DOCUMENTS 7,248,778 B1 * 7/2007 Anderson et al. ............. 386/52
2005/0025454 A1 * 2/2005 Nakamura et al. ............ 386/52

FOREIGN PATENT DOCUMENTS

GB    2387710 A    * 10/2003

* cited by examiner

*Primary Examiner*—Thai Tran
*Assistant Examiner*—Nigar Chowdhury
(74) *Attorney, Agent, or Firm*—Winston Hsu

(57) ABSTRACT

A method for implementing an adaptive mixing energy ratio between at least two soundtracks of video footage in a video image-editing environment is disclosed, the process being transparent to a user beyond a single step of initiation. The method includes applying at least one video/audio analysis technique to a session of video footage, demarcating the footage into a plurality of segments, determining a mixing energy ratio for each of the segments according to the analysis, and interpolating the mixing energy ratios for the segments to produce a mixing energy ratio profile before applying the mixing energy ratio profile to the session of video footage.

17 Claims, 4 Drawing Sheets

METHOD FOR IMPLEMENTING AN ADAPTIVE MIXING ENERGY RATIO IN A MUSIC-SELECTED VIDEO EDITING ENVIRONMENT

BACKGROUND OF INVENTION

1. Field of the Invention

The present invention relates to the field of video editing, more particularly, to the implementation of a volume mixing ratio between at least two soundtracks in a video editing environment, wherein each soundtrack is a speech soundtrack or a music soundtrack.

2. Description of the Prior Art

Video editing environments are generally created by software hosted by a computing device or dedicated video editing system. The availability of affordable hand-held analogue and, more recently, digital video recording devices, has made video recording accessible, viable and popular among amateur users. Furthermore, improvements in processing capacity in Personal Computers (PCs), now means that the amateur user can edit digital video without the requirement for any special equipment other than a PC equipped with suitable software.

A feature of prior art video editing environments is the '(volume) mixing energy ratio'. This parameter establishes the relative volumes between the speech soundtrack and the music soundtrack of a video presentation, where music has been selected. Naturally, as the content of the video presentation changes, so might the required emphasis on either music or speech. For example, an important conversation or speech where music is only a background consideration, will require a different mixing energy ratio to situations where music is employed to convey a mood or emotion, and any conversation is incidental and background.

A drawback with prior art video editing environments is that the user is only given the opportunity to select a mixing energy ratio that will apply to the entire section of video being edited, or editing session. One solution, which has been employed by professional video editors for decades, is manual adjustment of the mixing energy ratio segment by segment. But even for a skilled practitioner, this approach is onerous, added to which the amateur may only realize a degree of frustration and perhaps indifferent results too. Moreover, the above approach doesn't take advantage of the benefits that modern computing devices can offer.

This 'one size fits all' approach, therefore, can only offer a 'best fit' solution and cannot provide 'one touch' implementation of an adaptive mixing energy ratio, the level of which is in keeping with the requirements of each segment of a video presentation, as would be of great benefit to professional and amateur video editors alike.

SUMMARY OF INVENTION

A method for implementing an adaptive mixing energy ratio between at least two soundtracks of video footage in a video image-editing environment, carrying the benefit of freeing users from the task of manually adjusting the ratio scene by scene or segment by segment.

The method includes such steps as applying at least one video/audio analysis technique to a session of video footage for performing video/audio analysis, demarcating the video footage into a plurality of segments, determining a mixing energy ratio for each of the segments according to the analysis, and interpolating the segment mixing energy ratios to produce a mixing energy ratio profile before applying the mixing energy ratio profile to the session of video footage.

The video/audio analysis technique used in the derivation of the mixing energy ratio consider elements such as motion/action attributes, as well as predefined and non-predefined auditory or video patterns in the characterization of the footage. The characterization for a given portion of footage is used as a basis for determining the instant mixing energy ratio for that portion.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
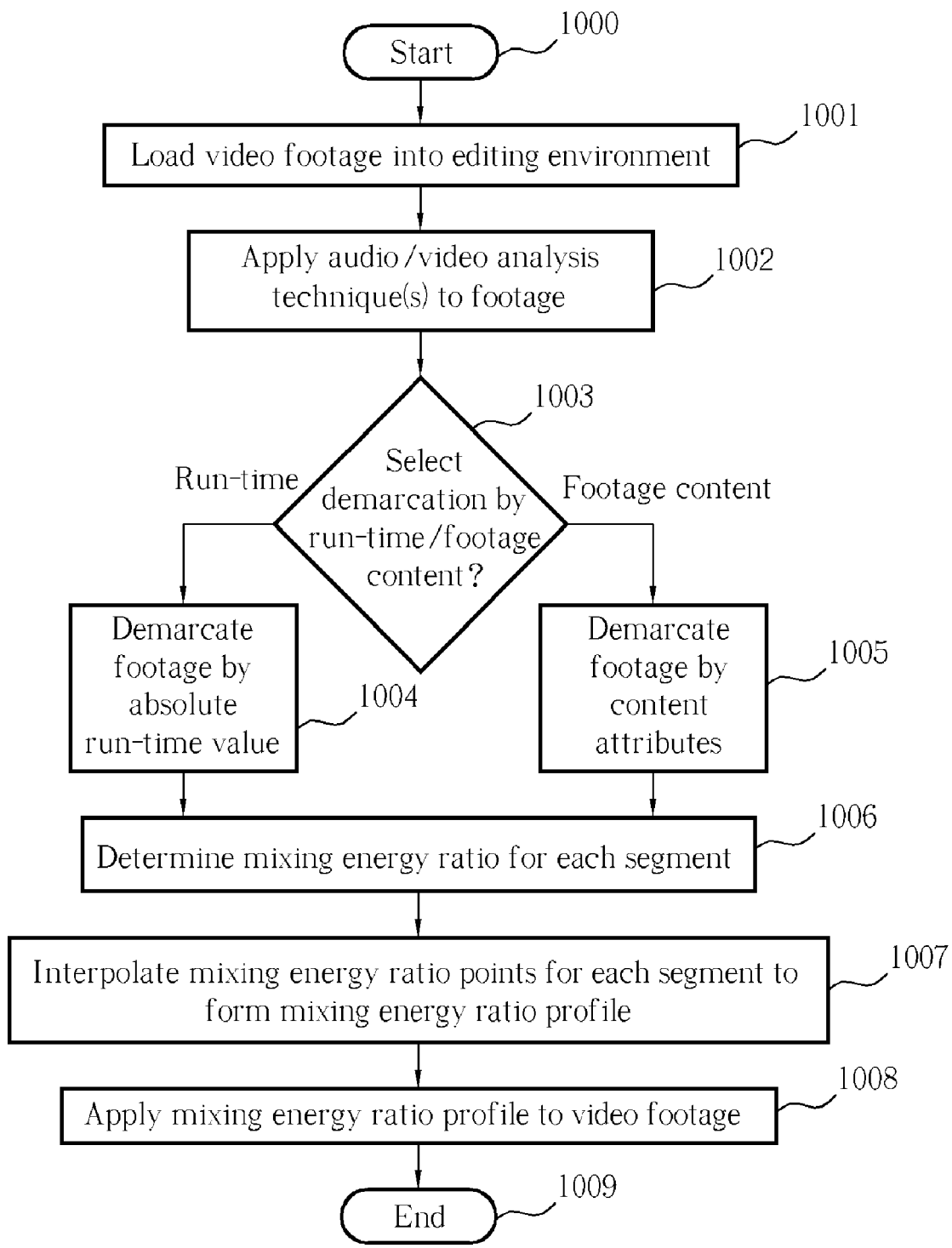
FIG. 1 shows a flow diagram of a preferred embodiment of the present invention.

The application of the method of the present invention can be realized through incorporation into many of the prior art video editing environments, and therefore operation will be similar in most aspects, although in some cases, by including the present invention method the minimum system requirements relating to a host device of a prior art environment may increase.

For the purposes of the description below, material edited by the video editing environment is referred to as 'video footage', this being the entirety of a video presentation or any part of a presentation undergoing editing in a particular editing session or otherwise specified (by user selection for example). Naturally, the run-lengths of video presentations (i.e. video footage) and any segments or sections that they may be divided into can vary widely, in some cases maximum run-length may only be limited by the amount of memory and/or processing power available; 'segments' may also vary in length, that length being regular or irregular and being designated for example, by the method in light of particular attributes, as a result of a user defined preference or as a result of a default setting. Hence, when footage is described herein as being 'loaded' into a video editing environment, this means stored in a computer readable media accessible by the video editing environment, as differing techniques regarding the handling of the customarily large files in which video is stored, may be used by different parent applications.

The key difference between a prior art video editing environment and one including the method of the present invention is apparent when a user wishes to set the mixing energy ratio between audio soundtracks, this generally being the volume energy balance between a speech and a music soundtrack. Please note that each mixing energy ratio can also be the volume energy balance between a plurality of speech soundtracks, music soundtracks, or any other type of soundtrack without departing from the scope of the invention. As mentioned above, the relative importance of each soundtrack in the context of the portion of video footage to which the soundtracks appertain, will vary. A prior art video editing environment will offer the user the opportunity to set a single mixing energy ratio for the entire session, generally either by manual input or by an automatic option. Also, advanced users may manually adjust the mixing energy ratio segment by segment, where such a facility is offered. Whereas, a video editing environment incorporating the method of the present invention will offer the user an option of selecting an automatic mixing energy ratio setting process for part or whole of the session video footage.

The present invention method employs in turn, both video analysis and audio analysis methods to determine 'regions of interest' in the video footage and segments of the footage that have 'special characteristics'. Both of the above categories contain attributes that can influence the level of mixing energy ratio applied to a particular portion of the footage. For example, a region of interest may be 3 minutes of footage in which two people are talking in a cafe with music playing in the background, and a special characteristic may be a specific sound such as a dog barking against a background of 'high mood' music. In the first example, video analysis techniques are used to characterize the setting and the action taking place, analyzing for example, foreground and background motion, the positioning and posture of human forms, while audio analysis techniques are used to analyze, for example, modes of speech from whispering to shouting and the style and mood of any background music. The method of the present invention uses the characterization output to determine the relative importance of the respective soundtracks, and can thus assign a suitable mixing energy ratio for the relevant portion of footage. Again in the second example, the method of the present invention uses the characterization output to identify the sound of a dog barking by comparison with an audio clip database; by weighing the characterization against other factors such as the presence of human voices, mood and tempo of any background music, and duration of dog barking, the method of the present invention can determine the relative importance of the soundtracks and assign a suitable mixing energy ratio. The described method can, therefore, be called 'adaptive'.

The auditory elements of the aforementioned 'regions of interest' and 'special characteristics' can be further categorized as 'predefined auditory patterns' and 'non-predefined auditory patterns'. Also, the footage can be analyzed with respect to 'predefined video patterns' and 'non-predefined video patterns'.

Predefined auditory patterns include the following:
i) Audio clips in an audio clip database containing:
Specific music melodies.
Specific speech sentences.
Specific sounds of living creatures.
Specific sounds of special events such as explosions or gun shots.
ii) Manually defined audio segments.
Non-predefined auditory patterns include the following:
i) Speech in a quiet environment (pure speech).
ii) Applause and laughter following a section of speech or music.
iii) High-mood music.
iv) Spoken keywords.
v) Stress placed on a specific section of speech.
vi) A recognizable relationship between length of speech segment and tempo of music.
vii) A recognizable relationship between tempo of speech segment and tempo of music.
viii) A recognizable relationship between length of speech segment and musical passages or the space between them.

The video/audio analysis technique that drives the analysis functions relied upon in this application are represented in 'black box' form only, the precise details of their operation not being relevant to the instant application other than the output returned by the various functions.

FIG. 1 shows a flow diagram of a preferred embodiment, and considers automatic mixing energy ratio level setting for session video footage in its entirety, and refers to the following steps:

1000 Start process.

1001 Loading video footage into a video-editing environment.

1002 Applying at least one video/audio analysis technique to each segment in order to perform a video/audio analysis.

1003 Selecting the method by which the footage is demarcated into segments (i.e. according to run-time (hence proceeding to step 1004) or footage content (hence proceeding to step 1005)).

1004 Demarcating a session of video footage into segments according to an absolute value of run-time in this example, however, other demarcation methods as discussed above are user or automatically selected as required. Upon completion of this step, the process proceeds to step 1006.

1005 (Redundant in this example.) Demarcating a session of video footage into segments according to content; this process may further divided into the various criteria for demarcating by content, for example by chapter, scene or area of interest.

1006 Determining a mixing energy ratio for each segment according to the video/audio analysis.

1007 Interpolating the mixing energy ratio for each segment to produce a mixing energy ratio profile.

1008 Applying the mixing energy ratio profile to the session of video footage.

1009 End process.

As detailed above, a preferred embodiment considers automatic mixing energy ratio level setting for session video footage in its entirety, however, in readily realizable alternative embodiments, the amount of footage to which the method is applied can be defined by the user in terms of run-time, scene, chapter or segment, including the isolation of certain types of scenes according to their properties.

Additionally, in a refinement of the preferred embodiment, user selections such as choice of demarcation method, required resolution of mixing energy ratio, i.e. the number of points calculated per segment, and the selection of interpolation method, may be requested from the user before any analysis takes place. In accordance with the above selections, analysis strategy may then be optimized for those exact requirements, thus saving time and system resources. There may also be other instances where the order in which the described processes are carried out is altered, while still deriving the required output of the present invention method, for example, where the method is optimized for compatibility with particular parent applications.

Figure 2:
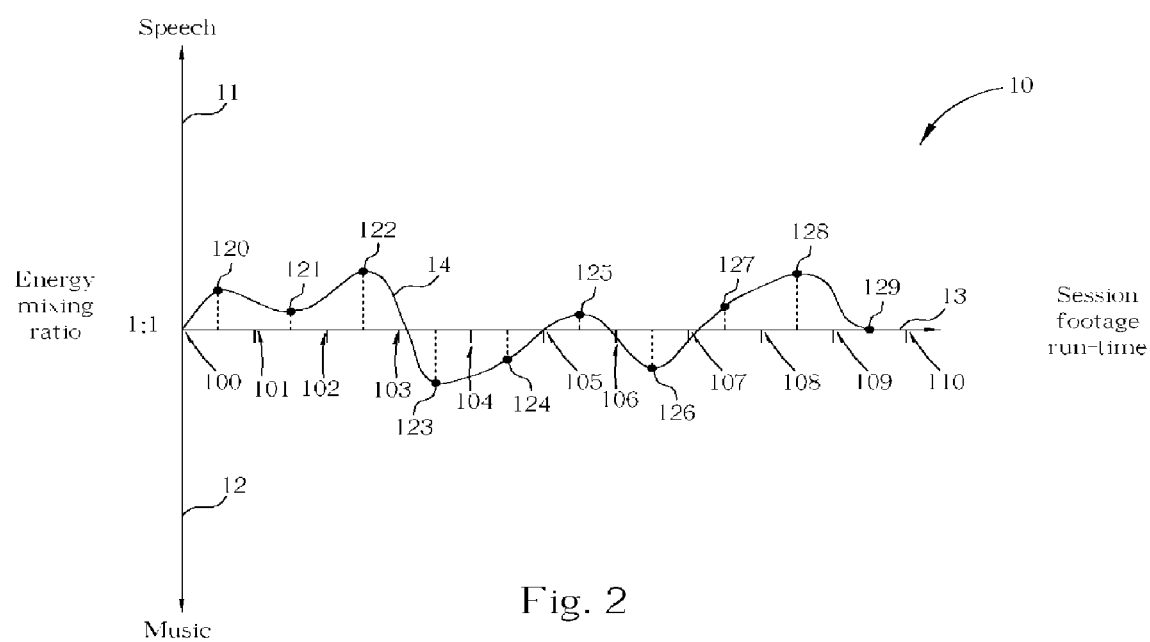
FIG. 2 shows a graph detailing the output of a preferred embodiment of the present invention.

Consider FIG. 2, which is a graph 10 showing the mixing energy profile for a session of video footage, having a positive going portion of a y-axis 11 representing speech soundtrack energy, a negative going portion of a y-axis 12 representing music soundtrack energy, and a portion of an x-axis 13 representing run-time, the mixing energy ratio profile being shown as a plot line 14. The total length of video footage run-time is not specified but may be determined by one the criteria detailed above. By way of example, the footage is demarcated into ten segments of equal length 100-110, although as also mentioned above, there are numerous rationales that may be applied to footage demarcation. In this example, points 120-128 represent average ratio values calculated for each of the segments 100-110; the mixing energy ratio profile 14 is interpolated to fit points 120-128.

Figure 3:
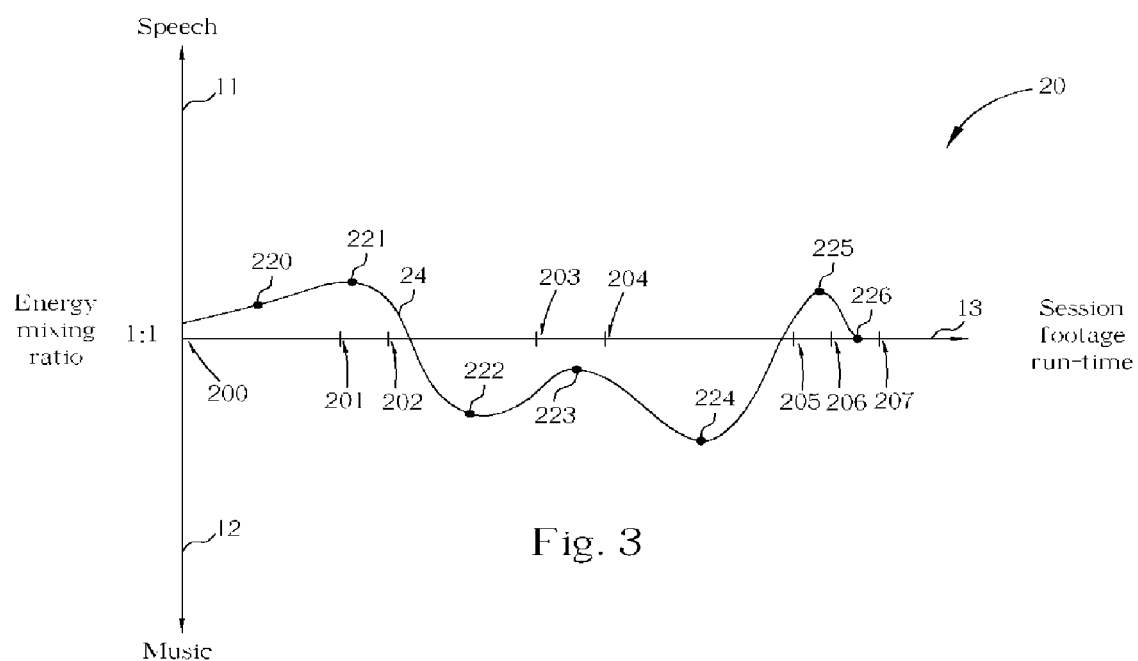
FIG. 3 shows a graph detailing the output of an alternative embodiment of the present invention.

FIG. 3 illustrates a graph 20, having similar properties to FIG. 2 but showing demarcation of the footage total run-time into segments by content considerations. Points 200-207 represent demarcation of the footage into segments containing discrete scenes or chapters, however, demarcation according to content classification, i.e. the kind of action taking place within the footage, may be represented by a very similar diagram. As with FIG. 2, points 220-226 represent average ratio values calculated for each of the segments 200-207; the mixing energy ratio profile 24 is interpolated to fit points 220-226.

Figure 4:
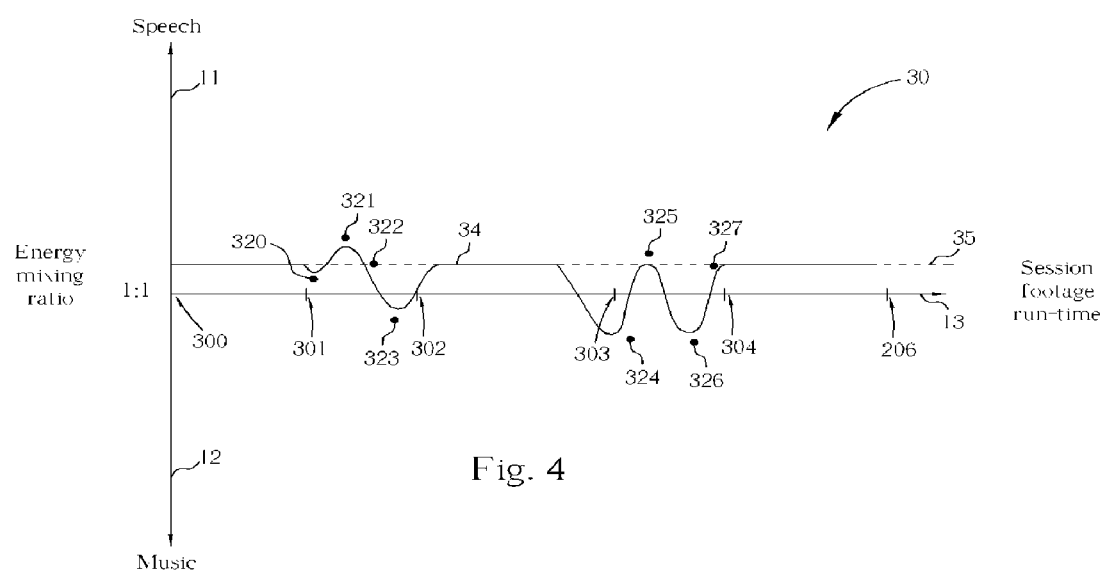
FIG. 4 shows a graph detailing the output of an alternative embodiment of the present invention.

FIG. 4 illustrates a graph 30, again having similar properties to FIGS. 2 & 3 but instead only showing demarcation of areas of special interest in the footage. This represents a technique whereby an averaged mixing energy ratio is applied to all segments not designated as areas of special interest, and an adaptive mixing energy ratio profile is applied to segments that are designated as areas of special interest. Further differences can be seen between the graph 30 of FIG. 4 and the previous graphs, in that instead of simply plotting an average value for the mixing energy ratio relating to the special interest segments, four points are plotted for each segment (this value is given by example only; a greater number of points may be used for each segment depending upon the required resolution). Additionally, in the graph 30 a 'best-fit' strategy is shown in the interpolation of the mixing energy ratio profile, whereby the profile is fitted as closely as possible to the plotted points, with the added restriction of a maximum gradient imposed on interpolation of the profile. The restriction of the profile gradient applies to both positive and negative going instances of the mixing energy ratio profile, and is a means by which sudden rapid changes in the realized mixing ratio can be avoided, and a smooth transition between differing ratio values achieved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for implementing an adaptive mixing energy ratio in an image-editing environment, comprising:
    applying at least one audio analysis technique to a session of video footage stored in a computer readable media for performing an analysis, wherein the footage is analyzed with respect to predefined auditory patterns and non-predefined auditory patterns wherein the predefined auditory patterns include audio clips in an audio database comprising at least one of specific music melodies, specific speech sentences, specific sounds of living creatures, and specific sounds of special events;
    demarcating the session of video footage into a plurality of segments;
    determining a mixing energy ratio for each of the plurality of segments according to the audio analysis;
    interpolating the mixing energy ratio for each of the plurality of segments to produce a mixing energy ratio profile; and
    applying the mixing energy ratio profile to the session of video footage.

2. The method of claim 1, further comprising applying at least a video analysis technique to a session of video footage stored in a computer readable media for performing an analysis.

3. The method of claim 2, wherein the video analysis technique returns predetermined parameters corresponding to properties of the footage for each of the plurality of segments.

4. The method of claim 1, wherein the demarcating step comprises demarcating the session of video footage into a plurality of segments based on predetermined run-time lengths.

5. The method of claim 1, wherein the demarcating step comprises demarcating the session of video footage into a plurality of segments based on contents of the footage.

6. The method of claim 1, wherein the audio analysis technique returns predetermined parameters corresponding to properties of the footage for each of the plurality of segments.

7. The method of claim 1, wherein the predefined auditory patterns further include
    manually defined audio segments.

8. The method of claim 1, wherein the non-predefined auditory patterns include at least one of:
    speech in a quiet environment;
    applause and laughter following a section of speech or music;
    high-mood music;
    spoken keywords;
    stress placed on a specific section of speech;
    a recognizable relationship between length of speech segment and tempo of music;
    a recognizable relationship between tempo of speech segment and tempo of music;
    a recognizable relationship between length of speech segment and musical passages; and
    a recognizable relationship between length of speech segment and a space between musical passages.

9. The method of claim 1, further comprising analyzing the footage with respect to predefined video patterns and non-predefined video patterns.

10. The method of claim 1, wherein the mixing energy ratio is a ratio of an audio energy of a first soundtrack to an audio energy of a second soundtrack.

11. The method of claim 10, wherein the first soundtrack is a speech soundtrack or a music soundtrack.

12. The method of claim 10, wherein the second soundtrack is a speech soundtrack or a music soundtrack.

13. The method of claim 10, wherein the first soundtrack and the second soundtrack each comprise a plurality of channels.

14. The method of claim 1, wherein the determining step comprises determining an average mixing energy ratio point for each of the plurality of segments.

15. The method of claim 1, wherein the determining step comprises determining a plurality of mixing energy ratio points for each of the plurality of segments.

16. The method of claim 1, wherein the step of applying the mixing energy ratio profile to the session of video footage comprises applying an adaptive mixing energy ratio to segments of special interest and applying an average mixing energy ratio to remaining segments of the session of video footage.

17. The method of claim 1, wherein the interpolating step comprises interpolating the mixing energy ratio for each of the plurality of segments to produce a mixing energy ratio profile, the maximum gradient of the mixing energy ratio profile being limited according to a predefined limit.

* * * * *